(12) United States Patent
Malito

(10) Patent No.: US 6,352,675 B1
(45) Date of Patent: Mar. 5, 2002

(54) PROCESS FOR REMOVING HEAVY METALS FROM A CAUSTIC FLUID STREAM

(75) Inventor: John T. Malito, Oswego, IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/326,959

(22) Filed: Jun. 7, 1999

(51) Int. Cl.7 .................. C22B 19/00; C22B 15/00; C22B 23/00; C22B 13/00; C22B 43/00
(52) U.S. Cl. .................. 423/143; 423/101; 423/42; 423/92; 423/50; 423/22
(58) Field of Search .................. 423/101, 42, 143, 423/140, 92, 50, 22

(56) References Cited

U.S. PATENT DOCUMENTS

| | | |
|---|---|---|
| 4,670,160 A | 6/1987 | Moriya et al. |
| 4,678,584 A * | 7/1987 | Elfline .................. 423/509 |
| 5,164,095 A | 11/1992 | Sparapany et al. |
| 5,205,939 A * | 4/1993 | Syrinek .................. 210/727 |
| 5,346,627 A | 9/1994 | Siefert et al. |
| 5,510,040 A | 4/1996 | Miller et al. |
| 5,599,515 A * | 2/1997 | Misra et al. .................. 423/101 |
| H1852 H * | 6/2000 | Alexander et al. .......... 210/710 |

FOREIGN PATENT DOCUMENTS

EP          090551       * 10/1983

* cited by examiner

*Primary Examiner*—Steven Bos
(74) *Attorney, Agent, or Firm*—Kelly L. Cummings; Thomas M. Breininger

(57) ABSTRACT

The present invention provides both reagents and a process for removing heavy metals from a caustic fluid stream by the addition of reagents which are not corrosive or deleterious. Specifically, the present invention is directed to removing heavy metals from a Bayer liquor in an aluminum processing plant. The reagents, dithiocarbamate and dithocarbonate groups, are added individually or in combination thereof to the Bayer liquor for the removal of heavy metals, such as zinc. The reagents form a complex with the heavy metal for the precipitation of the metal from the fluid stream. Once a complex is formed, the Bayer liquor is held in a quiescent state for a period of time sufficient for settling out of solution the precipitate. After settling out of solution, the precipitate is separated and removed and the Bayer liquor is then further processed into alumina.

19 Claims, No Drawings

PROCESS FOR REMOVING HEAVY METALS FROM A CAUSTIC FLUID STREAM

FIELD OF THE INVENTION

The present invention relates to an improved method for the removal of zinc and other metal impurities from alkali metal aluminate solutions. More particularly, the invention concerns the removal of zinc from Bayer process liquors by precipitation with either dithiocarbamates or dithiocarbonates.

BACKGROUND

The raw material for aluminum, alumina, can be found in all kinds of clays, but a red mineral known as bauxite, forms the basis for making aluminum. Bauxite ore is commonly found near the earth's surface and contains approximately 40 to 60 percent alumina. Once extracted, alumina is further refined in an electrolytic process and cryolite bath into aluminum metal.

The common method of extracting alumina from bauxite is known as the Bayer process. The Bayer process includes digesting the ground bauxite with an aqueous solution of an alkali, such as caustic soda, or with a mixture of caustic soda and sodium carbonate. Once mixed, a slurry is formed containing the insoluble constituents of bauxite and the alumina which is dissolved in a supersaturated sodium aluminate solution. Bauxite constituents remaining undigested during the alkali digestion form an insoluble residue, known as red mud. For the recovery of alumina, the sodium aluminate solution or Bayer liquor is separated from the red mud by a combination of sedimentation and filtration. The clarified liquor comprises an unstable solution of alumina from which most of the dissolved alumina is precipitated by seeding with alumina trihydrate. The precipitated alumina trihydrate is then separated from the liquor by sedimentation and filtration, washed, and calcined at high temperature to form alumina.

Caribbean bauxite ores have come into increased use by the aluminum industry, among which Jamaican is relatively high in zinc, which is a highly undesirable constituent of bauxite ore. Owing to the solubility of zinc oxide in caustic solutions, a substantial proportion of this zinc finds its way into the Bayer process liquors. Refineries which convert alumina to aluminum metal require a zinc content of no more than 100 ppm. For the alumina to contain 100 ppm or less of zinc the liquor phase of the Bayer process needs to contain no more than 5–6 ppm of zinc. Typically, Jamaican bauxite ores produce a liquor phase having 10–30 ppm zinc.

Common practice for alumina plants which process bauxite high in zinc includes the addition of sodium sulfide to precipitate zinc from the Bayer process liquor. Due to the amphoteric properties of zinc, there are very few $Zn^{2+}$ ions in the alkaline green liquor. Nearly all the zinc present in the alkaline green liquor is in the form of zincate ions, $ZnO_2^{2-}$ or $Zn(OH)_4^{2-}$. The zincate ions do not react directly with the sulfide added to the Bayer liquor. The high alkalinity of the Bayer process is responsible for the extreme shift to zincate ions. This extreme shift requires the sulfide charge to be added in excess of the stoichiometric amount required. The Bayer process takes place under a highly caustic environment which requires a large excess of a conventional zinc precipitant, such as sodium sulfide.

In addition, the Bayer liquor includes other ions which may react with sulfide ions. Therefore, the reaction between zinc species and sulfide ions in the Bayer liquor is by no means a stoichiometric amount. Thus, the excess of sulfide charge required to complete the reaction is even greater.

Sulfide is easily converted to sulfate, and more than half of the sodium sulfide charge can be expected to remain in the system and eventually be oxidized to sodium sulfate. Thus, addition of sodium sulfide to the Bayer process liquor can, over a period of time, increase the sulfate levels to 50 g/L. Excessive levels of sulfate are responsible for increased soda impurity in the product alumina, a slowdown in alumina trihydrate precipitation and the production of an alumina trihydrate having too fine a granulometry. There is also evidence that high sodium sulfide levels in the Bayer liquor cause high iron in the alumina trihydrate. Additionally, the increased potential for the formation of Burkeite scale in the liquor heat exchanger can impede heat transfer and adversely affect production. Substantial damage can also occur to metal parts in the high temperature side of the bauxite slurry heaters due to the corrosive nature of high levels of sulfide.

Additionally, the sulfide often used to precipitate the zinc is a byproduct obtained from an unrelated industrial process as a cost saving measure. The byproduct commonly chosen is from a hydrodesulfurization unit of a petroleum refinery. Such byproduct sulfide contains many organic impurities which can adversely affect liquor productivity and hydrate precipitation.

Sodium sulfide added to the Bayer liquor stream for extended periods can result in liquor contamination approaching approximately 50 g/l. Such a high sodium sulfate contamination imposes serious operating difficulties to the bauxite processing plant. Corrosion, scale, and impurities in the final product are all the result of excess sulfide added to the Bayer liquor for the precipitation of zinc. Thus, an alternative reagent for the removal of zinc from the Bayer liquor stream is needed.

SUMMARY

The present invention is directed to both reagents and process for removing heavy metals from a caustic fluid stream by the addition of reagents which are not corrosive or damaging. The reagents include dithiocarbamate and dithiocarbonate groups. Such reagents are added to the caustic fluid stream individually or combination thereof. The reagents form a compound with the heavy metal for the precipitation of the metal from the fluid stream, which may be removed by sedimentation with the mud in the settlers or by filtration in the liquor filter used for removing trace amounts of suspended solids present in the liquor coming from the settler overflow stream.

Preferably, the caustic fluid stream is a Bayer liquor, which is a mix of bauxite ore and caustic soda used in a bauxite processing plant for the production of alumina. Essentially, the Bayer liquor is a mixture of sodium hydroxide, sodium aluminate and various impurities contained in the bauxite ore. A majority of the impurities are not soluble in the Bayer liquor and settle out as red mud which is then removed. However, zinc and various other heavy metals are soluble in the Bayer liquor and dissolve into solution along with the aluminum oxide. Thus, the process provides both method and reagents for the removal of heavy metals, such as zinc from the Bayer liquor without the deleterious effects of adding sulfide compounds to the liquor.

The reagents used to precipitate zinc from the caustic fluid are preferably nonpolymeric and have a relatively small molecular weight, approximately 5,000 Daltons or less. It has been surprisingly discovered that compounds having a relatively small molecular weight, less than 5,000 Daltons, are more effective at removing heavy metals from a caustic fluid stream than larger polymeric compounds with similar chemical structures. In fact, polymeric compounds have been found to be relatively ineffective in removing heavy metals from the Bayer liquor. Which is surprising, considering that such polymeric compounds have been used for sometime in removing heavy metals from wastewater streams. The high pressure, high temperature caustic environment of the Bayer liquor in the bauxite processing plant is thought to render such polymeric compounds relatively ineffective.

DETAILED DESCRIPTION

The present process provides both reagents and method for removing heavy metals from a caustic fluid stream by the addition of a class of treatment reagents, dithiocarbamate and dithocarbonate, to the caustic fluid stream. Preferably, the caustic stream is a Bayer liquor and the heavy metal is zinc which forms a complex with the treatment chemicals and is precipitated out of the Bayer liquor.

The current process is primarily directed to the removal of zinc from the Bayer liquor. Because of zinc oxide's solubility in caustic solutions and zinc's effect on the quality of the processed alumina product its removal is highly desirable. Additionally, the present process can remove additional metals that may be present in the Bayer liquor. Such metals include, titanium, vanadium, chromium, copper, nickel, lead, mercury, cadmium, silver, manganese, palladium, and platinum. The metals are given as examples, but such a list is not meant to be exhaustive since other metals may be removed under the process of the present invention.

The treatment reagents are generalized as being either dithiocarbamates or dithiocarbonates (also known as xanthates). Both reagents are effective in removing heavy metals from the Bayer liquor. The reagents may be either used alone, in combination or with other precipitating reagents.

Dithiocarbamates are represented by the general formula of $R1R2NCS_2M$, where R1 and R2 can be a hydrogen, or any linear or branched alkyl, aryl or phenyl group. Such groups may also contain other NR1R2 groups that may be converted to the dithiocarbamate. M is any of the Group I metals such as Li, Na, K, Rb, Cs, ammonium and quaternary amine. The general structure of the dithiocarbamate is given below:

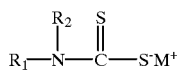

Dithiocarbonates are represented by the general formula $ROCS_2M$, where R can be hydrogen, or any linear or branched alkyl, aryl or phenyl group. Such groups may also contain other OH groups that may be converted to the dithiocarbonates. M is any of the Group I metals such as Li, Na, K, Rb, Cs, ammonium and quaternary amine. The general structure of the dithiocarbonate is given below:

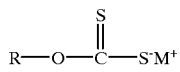

The preferred reagents are nonpolymeric in nature and are sized smaller than most polymeric compounds, having a molecular weight less than 5,000 Daltons. The reagents preferably have a molecular weight less than 1,000 Daltons. Polymers may be used as a reagent, but such are not preferred since most polymeric compounds have a molecular weight substantially greater than 5,000 Daltons. Additionally, polymers are typically more expensive relative to their nonpolymeric counterparts, and the inclusion of polymers is thought to be economically disadvantageous.

Surprisingly, it has been discovered that smaller molecules, those whose molecular weight is less than 1,000 Daltons, were significantly more effective in removing zinc from the Bayer liquor than their larger polymeric counterparts. A result which may be attributed to the high temperature, high pressure caustic environment of the Bayer liquor within the bauxite processing plant.

Within the process the reagents are added to the Bayer process at various phases. Typically, the reagents are added at 0.05 to 1.0 g/l, and preferably 0.3 to 0.4 g/l depending upon the reagent chosen. The reagents may be added alone in or combination with each other. The Bayer process is essentially composed of four distinct phases: digestion, clarification, precipitation, and calcination. Not every phase is conducive to the addition of reagents for the removal of heavy metals.

The Bayer process typically entails the production of a caustic fluid stream or Bayer liquor defined as any liquid containing sodium hydroxide and sodium aluminate which is used anywhere in the bauxite processing plant for the production of alumina trihydrate, alumina monohydrate or alumina. A mixture of crushed bauxite ore and caustic soda solution which forms a slurry. Typically, the alkalinity of the slurry is equivalent to 200–300 g/l of sodium carbonate. The crushed bauxite ore typically contains 40% to 60% alumina, about 20% iron oxides, with the remaining portions being titanium oxide, silica and minor elements such as zinc, calcium, magnesium, manganese and phosphorous. The caustic environment greatly hinders the removal of zinc from the liquor since zinc dissolves in the sodium aluminate solution and is not easily precipitated from the solution.

Digestion is the initial phase which dissolves the alumina into solution. The digester heats the slurry to approximately 150–250 degrees Celsius under about 200–3000 kilopascals of pressure. The heat, high pressure, and caustic environment are all conducive to the formation of a sodium aluminate solution or green liquor, which is the product of aluminum oxide and caustic soda. A majority of the impurities in the bauxite ore later settle out of solution since they are not dissolved by the caustic soda solution. The reagents may be added during the digestion phase but such addition is not preferred due to the harsh environment of the digester.

After the digestion phase, the green liquor is pumped to various flash tanks to reduce pressure and recover heat before being feed to the settling or clarification tanks. In the clarification phase, impurities not dissolved in the caustic soda solution are allowed to settle out or are removed by filtration as red mud. Red mud is so named since iron oxide, which is red-brown, comprises a majority of the impurities in the mud. The green liquor is decanted from the settling tanks and is then fed to filtering tanks as a clarified liquor ready for filtration to remove trace levels of suspended solids. Preferably, the settler feed or filtration feed phases are the delivery points at which the reagents of the present invention are added.

The green liquor and reagent mix are held in a quiescent state within the settling tanks for the settling out of the reagent/zinc compound. The reagent can also be added to any liquor stream between, and including, the liquor overflowing the settler and the liquor feeding the filters. The retention time for the green liquor and reagent mix of the current process is preferably at least 45 minutes, but 60 minutes or more is preferred. A retention time of approximately 45 minutes or more is needed to satisfactorily precipitate out the reagent/zinc complex from the green liquor. Retention times of less than 45 minutes can also provide adequate precipitation if precipitation aids such as flocculants and coagulants are added to the mix.

Of course the Bayer process may have additional steps from the ones set forth above. Additionally, the steps may be modified or altered depending upon the specific requirements of the bauxite processing plant. Thus, the reagents may be added in any step or phase of the bauxite ore refining process so long as the zinc precipitate formed with the reagents can be separated from the alumina.

Set forth below are various specific examples of dithiocarbamates and dithiocarbonates, the reagents of the present invention for the precipitation of heavy metals from a caustic fluid stream. The examples illustrate a reagent's capacity to precipitate zinc from a representative Bayer liquor. The examples are not intended to be limited to a specific metal or type of caustic fluid, but only illustrate such properties of the present invention as precipitating a heavy metal from a caustic fluid stream.

EXAMPLE 1

Experiments were run on seven proposed reagents for evaluating the reagent's ability to remove soluble zinc from a Bayer liquor. Six of the seven reagents were dithiocarbamates and the seventh was a dithiocarbonate. The composition and formula weight for the seven tested reagents are listed in Table I below:

TABLE I

| Reagent | Composition | MWT | Parent Compound |
|---------|-------------|-----|-----------------|
| A | $CH_3NHCS_2Na$ | 129.17 | Methylamine |
| B | $NaO_2CCH_2NHCS_2Na$ | 195.18 | Glycine |
| C | $NaS_2CNH(CH_2CH_2NH)_2CH_2CH_2NHCS_2Na$ | 342.48 | Triethylenetraamine |
| D | $HOCH_2CH_2NHCS_2Na$ | 159.20 | Monoethanolamine |
| E | $(CH_3CH(OH)CH_2)_2NCS_2Na$ | 231.31 | Diisopropanolamine |
| F | $NaS_2CNHCH_2CH_2NHCS_2Na$ | 256.34 | Ethylenediamine |
| G | $CH_3OCS_2Na$ | 130.16 | Methanol |

The synthetic Bayer liquor is a supersaturated sodium aluminate solution containing the same alkalinity, caustic soda and alumina as a typical green liquor found in a Bayer plant. Zinc is added at a level between 10–40 ppm. The synthetic Bayer liquor of the present example is prepared per liter as follows:

1) Charge 332.0 g of 50% NaOH and 500 g of deionized water into a stainless-steel pot equipped with stirrer.
2) Add 48.3 g $Na_2CO_3$ and heat to 100° C. on a hot-plate with stirring until solid dissolves.
3) Add 235.5 g alumina trihydrate and heat to 105–108° C. with stirring until solid dissolves.
4) Remove the pot from the hot-plate and add 123.2 g deionized water.
5) Filter through a glass fiber filter to remove traces of solids.
6) Add 15 ml of 1000 ppm zinc solution.

All the reagents of the present example are prepared in water to give a final concentration of 50 g/L. A total of 4 ml of reagent solution was added to 200 ml of test liquor containing 18.8 mg of zinc per liter of liquor and 1.5 g/L of filter aid (tricalcium aluminate). The mixture was then gently stirred for 2 hours in a water bath maintained at 95° C. Finally, the precipitated zinc and filter aid were removed by filtration though a 0.45 micron filter. The concentration of zinc in the filtrate was determined using standard analytical procedures. The tricalcium aluminate filter aid dose not play a part in the removal of the zinc, nor is it necessary for the function of the reagent. Table II illustrates obtained results for the listed reagents and control sample.

TABLE II

| Reagent | Dose, mg/L | Equil.Zn, mg/L |
|---------|------------|----------------|
| Blank | N/A | 18.8 |
| A | 1000 | 4.9 |
| B | 1000 | 7.8 |
| C | 1000 | 7.5 |
| D | 1000 | 5.9 |
| E | 1000 | 8.1 |
| F | 1000 | 4.4 |
| G | 1000 | 4.9 |

EXAMPLE 2

Experiments were performed using 13 proposed reagents for evaluating the reagent's ability to remove soluble zinc from an actual Bayer liquor extracted from the settler overflow. The reagents tested represented both dithiocarbamates and dithiocarbonates. Each reagent was tested at a concentration of 0.5 g/L. The reagent, its formula and remaining zinc concentration in the liquor after reagent addition is included in Table III below:

TABLE III

| Reagent | Reagent Formula | Remaining Zinc, mg/L |
|---------|-----------------|----------------------|
| None | | 56.3 |
| $CH_3NHCS_2Na$ | sodium methyldithiocarbamate | 4.6 |
| $HOCH_2CH_2NHCS_2Na$ | sodium 2-ethanoldithiocarbamate | 4.9 |
| $(CH_2NHCS_2Na)_2$ | sodium ethylenebisdithiocarbamate | 3.1 |
| $CH_3OCS_2Na$ | sodium methyl xanthate | 19.3 |
| $(CH_2CH_2NCS_2Na)_n$ | poly(ethyleneiminedithio-carbamate), sodium salt | 18.2 |
| $(CH_2CH(OCS_2Na))_n$ | poly(vinyl alcohol xanthate), sodium salt | 25.4 |
| $NH_2CS_2NH_4$ | ammonium aminodithiocarbamate | 15.5 |
| None | | 26.6 |
| $CH_3OCS_2Na$ | sodium methyl xanthate | 8.6 |
| $(CH_2NHCS_2Na)_2$ | sodium ethylenebisdithiocarbamate | 9.1 |
| $NH_2CS_2NH_4$ | ammonium dithiocarbamate | 5.0 |
| None | | 23.7 |
| $(CH_3)_2CHOCS_2K$ | potassium isopropyl xanthate | 15.6 |
| $(CH_3)_2NCS_2Na$ | sodium dimethyldithiocarbamate | 18.5 |
| $Na_2CS_3$ | sodium trithiocarbonate | 15.1 |

EXAMPLE 3

Experiments were performed on 8 proposed reagents for evaluating the reagent's ability to remove soluble zinc from an actual Bayer liquor extracted from the settler overflow. The reagents tested were from both the general groups of dithiocarbamates and dithiocarbonates. Reagents were tested at various strengths and a few with differing Bayer liquor samples. The reagent, its dosage and remaining zinc concentration in the liquor after the addition of the reagent is included in each Table below:

TABLE IV

Removal of zinc from settler overflow liquor using various doses of sodium methyldithiocarbamate.

| Dose, g/L | Remaining Zinc, mg/L |
|---|---|
| No treatment | 27.2 |
| 0.25 | 21.3 |
| 0.50 | 5.9 |
| 0.75 | 2.4 |

TABLE V

Removal of zinc from settler overflow liquor using various doses of 2-ethanoldithiocarbamate, sodium salt.

| Dose, g/L | Remaining Zinc, mg/L |
|---|---|
| No treatment | 26.7 |
| 0.25 | 16.0 |
| 0.50 | 5.4 |
| 0.75 | 2.7 |

TABLE VI

Removal of zinc from settler overflow liquor using various doses of sodium ethylenebisdithiocarbamate.

| Dose, g/L | Remaining Zinc, mg/L |
|---|---|
| No treatment | 16.5 |
| 0.25 | 4.0 |
| 0.50 | 1.4 |
| 0.75 | 0.78 |
| No treatment | 56.9 |
| 0.1 | 56.9 |
| 0.2 | 37.0 |
| 0.4 | 9.1 |
| No treatment | 8.0 |
| 0.1 | 4.7 |
| 0.2 | 4.4 |
| 0.4 | 2.2 |

TABLE VII

Removal of zinc from settler overflow liquor using various doses of sodium methyl xanthate.

| Dose, g/L | Remaining Zinc, mg/L |
|---|---|
| No treatment | 28.1 |
| 0.25 | 24.6 |
| 0.50 | 17.3 |
| 0.75 | 11.9 |

TABLE VIII

Removal of zinc from settler overflow liquor using various doses of poly(iminedithiocarbamate), sodium salt.

| Dose, g/L | Remaining Zinc, mg/L |
|---|---|
| No treatment | 24.5 |
| 0.25 | 24.6 |
| 0.50 | 21.5 |
| 0.75 | 12.7 |

TABLE IX

Removal of zinc from settler overflow liquor using various doses of ammonium dithiocarbamate.

| Dose, g/L | Remaining Zinc, mg/L |
|---|---|
| No treatment | 28.9 |
| 0.25 | 19.2 |
| 0.50 | 7.4 |
| 0.75 | 4.4 |

TABLE X

Removal zinc from settler overflow liquor using various doses of ammonium ethylenebisdithiocarbamate.

| Dose, g/L | Remaining Zinc, mg/L |
|---|---|
| No treatment | 20.3 |
| 0.1 | 9.7 |
| 0.2 | 4.5 |
| 0.4 | 2.0 |
| No treatment | 57.0 |
| 0.1 | 55.1 |
| 0.2 | 25.2 |
| 0.4 | 6.0 |

TABLE XI

Removal of zinc from settler overflow liquor using various doses of potassium ethyl xanthate.

| Dose, g/L | Remaining Zinc, mg/L |
|---|---|
| No treatment | 21.6 |
| 0.1 | 18.6 |
| 0.2 | 10.4 |
| 0.4 | 3.9 |
| 0.6 | 2.3 |
| No treatment | 29.2 |
| 0.1 | 26.5 |
| 0.2 | 13.5 |
| 0.4 | 3.5 |

The current process has been described in an illustrative manner, and it is to be understood that the terminology which has been used is intended to be in the nature of words of description rather than of limitation.

Obviously, many modifications and variations of the present process are possible in light of the above teachings. It is, therefore, to be understood that within the scope of the appended claims the process may be practiced otherwise than as specifically described.

What is claimed is:

1. A method for removing heavy metals from a Bayer liquor that includes at least one heavy metal, the method comprising:

adding only a dithiocarbamate having a molecular weight less than about 5,000 Daltons to the Bayer liquor forming a complex of the heavy metal and allowing such complex to settle as a precipitate; and separating the precipitate from the liquor.

2. The method of claim 1 wherein the dithiocarbamate is added at between about 0.05 to about 1.0 g/l to the caustic fluid stream.

3. The method of claim 1 wherein the dithiocarbamate has a molecular weight less than about 1000 Daltons.

4. The method of claim 1 wherein the dithiocarbamate is represented by the general formula of $R1R2NCS_2M$, wherein R1 and R2 are selected from the group consisting of hydrogen, linear alkyl, branched alkyl, aryl and phenyl group and wherein M is selected from the group consisting of Li, Na, K, Rb, Cs, ammonium and quaternary amine.

5. The method of claim 4 wherein the dithiocarbamate further includes other NR1R2 groups.

6. The method of claim 1 wherein the dithiocarbamate is added to a clarified liquor.

7. The method of claim 1 wherein the dithiocarbamate is nonpolymeric.

8. The method of claim 1 wherein the heavy metal is selected from the group consisting of zinc, copper, nickel, lead, mercury, cadmium, silver, manganese, palladium, and platinum.

9. The method of claim 1 wherein the complex is held in a quiescent state for at least 45 minutes allowing for settling out of solution the complex as the precipitate.

10. A method for removing heavy metals from a caustic fluid stream, comprising:

adding a dithiocarbonate having a molecular weight less than about 5000 Daltons to the caustic fluid stream, wherein the fluid stream includes at least one heavy metal;

forming a complex of the heavy metal and allowing such complex to settle as a precipitate; and separating the precipitate from the fluid.

11. The method of claim 10 wherein the dithiocarbonate is added at between about 0.05 to about 1.0 g/l to the caustic fluid stream.

12. The method of claim 10 wherein the dithiocarbonate is added to a clarified liquor.

13. The method of claim 10 wherein the dithiocarbonate is added to a slurry of red mud.

14. The method of claim 10 wherein the dithiocarbonate is nonpolymeric.

15. The method of claim 10 wherein the dithiocarbonate has a molecular weight less than about 1000 Daltons.

16. The method of claim 10 wherein the dithiocarbonate is represented by the general formula of $ROCS_{(2)}M$ wherein R is selected from the group consisting of hydrogen, linear alkyl, branched alkyl, aryl and phenyl group and wherein M is selected from the group consisting of Li, Na, K Rb, Cs, ammonium and quaternary amine.

17. The method of claim 10 wherein the caustic stream is a Bayer liquor and the heavy metal is selected from the group consisting of zinc, copper, nickel, lead, mercury, cadmium, silver, manganese, palladium, and platinum.

18. The method of claim 10 wherein the dithiocarbonate includes other OH groups.

19. The method of claim 10 wherein the complex is held in a quiescent state for at least 45 minutes for settling out of solution the complex as the precipitate.

* * * * *